United States Patent [19]

Hasegawa et al.

[11] Patent Number: 4,677,824

[45] Date of Patent: Jul. 7, 1987

[54] OUTPUT CONTROL APPARATUS FOR STIRLING ENGINES

[75] Inventors: Masahiko Hasegawa, Anjyo; Yoshihiro Naito, Nagoya; Masaru Tsunekawa, Aichi; Yutaka Momose, Anjyo, all of Japan

[73] Assignee: Aisin Seiki Kabushiki Kaisha, Aichi, Japan

[21] Appl. No.: 911,871

[22] Filed: Sep. 26, 1986

[30] Foreign Application Priority Data

Sep. 26, 1985 [JP] Japan ............................... 60-214065

[51] Int. Cl.[4] ............................................... F02C 1/04

[52] U.S. Cl. ..................................................... 60/521

[58] Field of Search .................................. 60/521, 522

[56] References Cited

U.S. PATENT DOCUMENTS

| | | | |
|---|---|---|---|
| 3,371,491 | 3/1968 | Pinter . | |
| 3,372,539 | 3/1968 | Reinhoudt . | |
| 3,458,994 | 8/1969 | Heffner | 60/521 |
| 3,466,867 | 9/1969 | Brandes | 60/521 |
| 3,550,371 | 12/1970 | Jaspers . | |
| 3,554,672 | 1/1971 | Brandes | 60/522 X |
| 3,600,886 | 8/1971 | Jaspers | 60/521 |

*Primary Examiner*—Allen M. Ostrager

*Attorney, Agent, or Firm*—Burns, Doane, Swecker & Mathis

[57] ABSTRACT

A Stirling engine control apparatus includes a pressure reducing valve provided in a maximum cycle pressure line connecting a working space to a working gas compressor and a working gas tank via a first check valve, a pressure boost valve provided in a minimum cycle pressure line connecting the working space to the working gas storage tank via a second check valve, an operating lever pivotable about a movable fulcrum for controlling opening and closing of the pressure reducing valve and the pressure boost valve, a movable member on which the movable fulcrum of the operating lever is provided, and control means for positionally shifting the movable member upon comparing a target pressure corresponding to displacement of the operating lever and pressure within the minimum cycle pressure line.

2 Claims, 4 Drawing Figures

OUTPUT CONTROL APPARATUS FOR STIRLING ENGINES

BACKGROUND OF THE INVENTION

1. Field of the Invention

This invention relates to an apparatus for controlling the output of a Stirling engine.

2. Description of the Prior Art

The output of a Stirling engine, which is an engine of the external combustion type, is determined by the pressure in a working space in which a working gas is sealed. For example, when it is desired to raise the output of a Stirling engine, the pressure of the working gas in the working space is raised. A typical prior-art output control apparatus for a Stirling engine, such as described in the specification of Japanese Patent Application Laid-Open No. 46-23534, is shown in FIG. 1. Each working space 1 of the engine is connected via a check valve 2 to a compressor 3 by way of a maximum cycle pressure line 4. The line 4 has a pressure reducing valve 5. Each working space 1 is also connected via another check valve 6 to the the compressor 3 by way of a minimum cycle pressure line 7, which has a pressure boost valve 8. Numeral 9 denotes a high pressure tank.

The downstream side of the pressure boost valve 8 is connected to a feedback piston cylinder 10 having a piston 10*a* connected via a piston rod 10*b* to one end of an accelerator lever 11, which serves as an operating lever. A valve stem 12 of the pressure boost valve 8 and a valve stem 13 of the pressure reducing valve 5 are disposed in facing relation with respect to the sides of the accelerator lever 11. The piston 10*a* is moved as a function of the pressure in the feedback piston cylinder 10 in such a manner as to shift the position of a fulcrum 14 of the accelerator lever 11.

When it is desired to raise the output of the Stirling engine, the accelerator lever 11 is pushed leftwards to open the pressure boost valve 8 in order to supply the pressurized working gas to the working space 1 from the compressor 3 or tank 9. Conversely, when it is desired to lower the engine output, the accelerator lever 11 is pushed rightwards to open the pressure reducing valve 5 in order to vent the pressure in the working space 1 toward the compressor 3 and lower the pressure within the working space 1.

The amount of movement of the rod 10*b* of feedback piston cylinder 10 is proportional to the pressure in the minimum pressure cycle line 7. Therefore, in a case where a grip portion 11*a* on the accelerator lever 11 is held at a constant position for acceration, the position of the fulcrum 14 of the accelerator lever 11 is shifted gradually rightward according to the pressure in the minimum pressure cycle line 7. As a result, although the accelerator lever 11 is held at said constant position for acceleration, the pressure boost valve is likely to close its opening. During the time that the boost valve makes the transition from the slightly open state to the fully closed state, passage of the working gas is allowed to slowly continue. The valve opening fluctuates for several tens of seconds before settling down.

As a result of this phenomenon, engine torque gradually rises even if the accelerator lever is at a constant position. If the load is constant, therefore, engine rpm will rise. The present invention is directed to solving this problem.

SUMMARY OF THE INVENTION

Accordingly, an object of the present invention is to provide a Stirling engine output control apparatus in which the pressure boost and pressure reducing valves can be fully closed in a rapid manner.

According to the present invention, the foregoing object is attained by providing a Stirling engine control apparatus comprising: a working gas compressor; a working gas storage tank; a maximum cylce pressure line connecting a working space to the working gas compressor and the working gas tank via a first check valve; a pressure reducing valve provided in the maximum cycle pressure line; a minimum cylce pressure line connecting the working space to the working gas storage tank via a second check valve; a pressure boost valve provided in the minimum cycle pressure line; an operating lever pivotable about a movable fulcrum for controlling opening and closing of the pressure reducing valve and the pressure boost valve; a movable member on which the movable fulcrum of the operating lever is provided; and control means for positionally shifting the movable member upon comparing a target pressure corresponding to displacement of the operating lever and pressure within the minimum cycle pressure line.

When a grip on the operating lever is displaced, the position of the movable fulcrum is maintained in such a manner that the pressure boost and pressure reducing valves attain their optimum openings to provide a rapid increase in pressure until the target pressure corresponding to the amount of operating lever displacement is reached. After the pressure has neared the target pressure, the control means moves the movable member, on which the movalbe fulcrum is provided, in such a manner that the valves attain their fully closed positions, thereby terminating any fluctuation in pressure. Accordingly, the pressure will not rise over several seconds.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
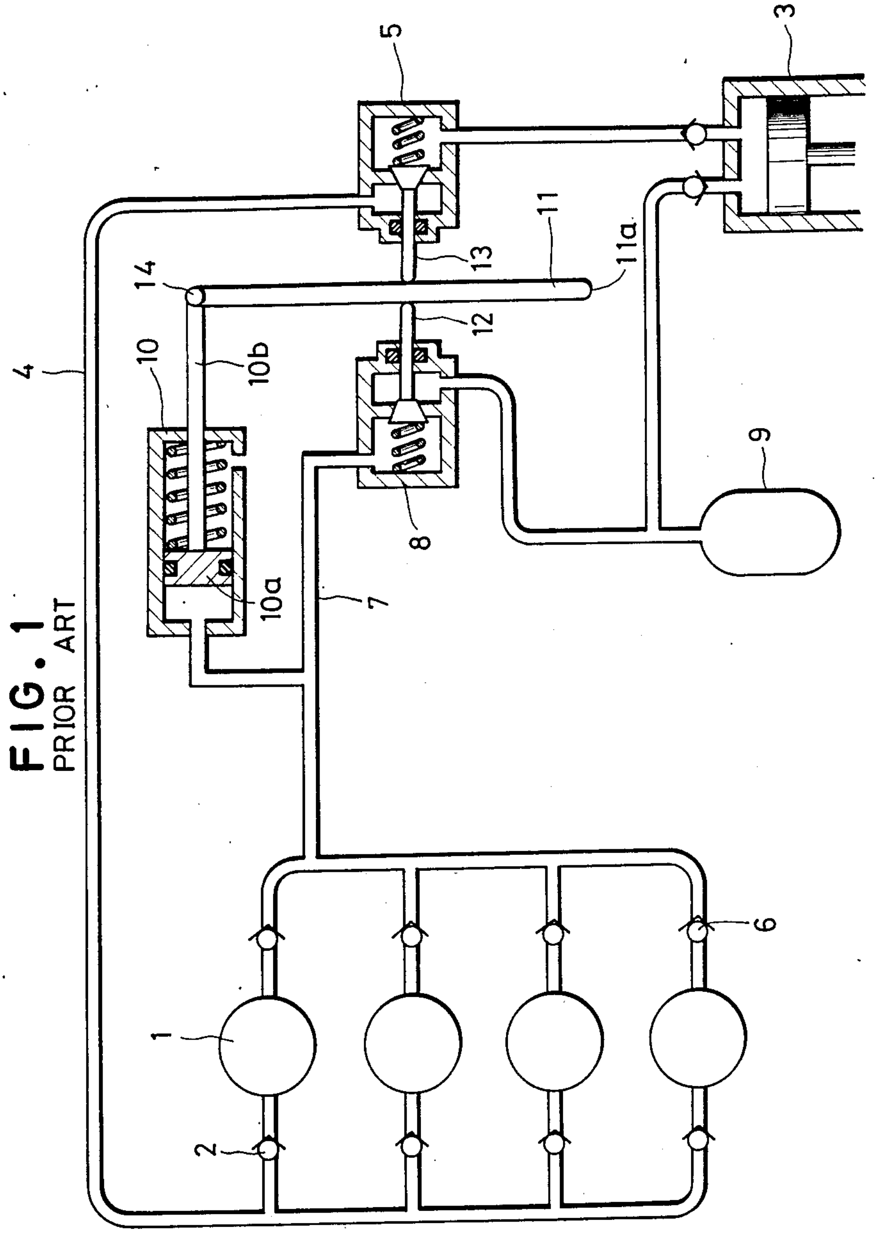
FIG. 1 PRIOR ART
FIG. 1 is a schematic view illustrating an example of the prior-art control apparatus for a Stirling engine.

A preferred embodiment of the present invention will now be described with reference to FIG. 2, wherein portions identical with those shown in FIG. 1 are indicated by like reference numerals and the corresponding description is omitted.

Figure 2:
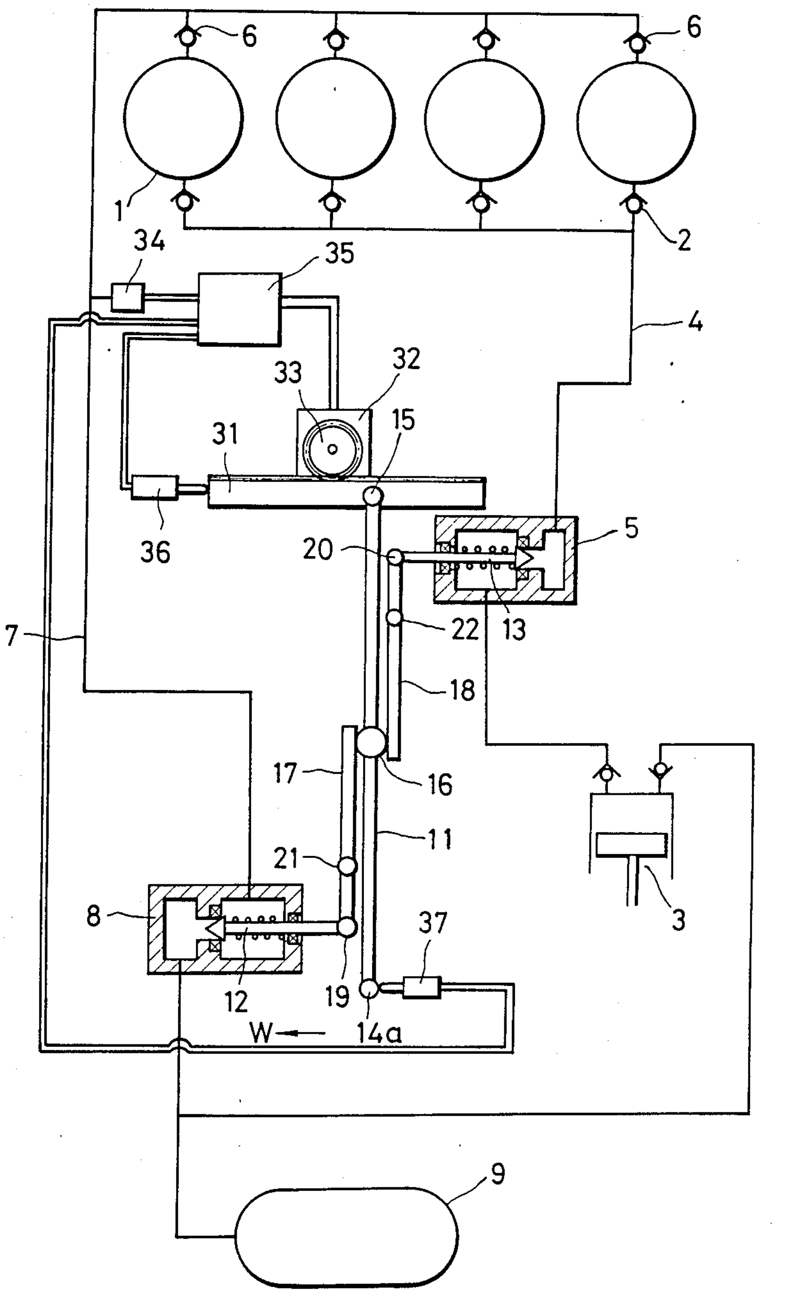
FIG. 2 is a schematic view illustrating an embodiment of a Stirling engine output control apparatus according to the present invention.

As shown in FIG. 2, the operating lever (accelerator lever) 11 has a grip 14*a* at one end, and the feedback cylinder 10 has a portion 15 serving as a movable fulcrum or pivot point 15 of the operating lever 11. A point of application 16 is provided between grip 14 and the fulcrum 15. A link lever 17 is pivotally supported on the valve stem 12 of pressure boost valve 8, and a link lever 18 is pivotally supported on the valve stem 13 of pressure reducing valve 5. The link levers 17, 18 are pivoted so as to lie generally parallel to the operating lever 11. The valve stem 12 and link lever 17 are connected at a support point 19, and the valve stem 13 and link lever 18 are connected at a support point 20. The link lever 17 has a fulcrum 21 provided between the support point 19 and point of application 16. Similarly, the link lever 18 has a fulcrum 22 provided between the support point 20 and point of application 16.

Assume that the point of application 16 is arranged at a position intermediate the grip 14 of the operating lever 11 and the movable fulcrum 15, and that link levers 17, 18 have a lever ratio of 3:1. A unidirectional operation force W applied to the grip 14 of the operating lever 11 becomes a force of 2W at the point of application 16, and this force acts upon one of the link levers. Since the lever ratio of the link levers is assumed to be 3:1, the force will act upon the support point 19 of link lever 17 or the support point 20 of link lever 18. Thus, the force applied to the valve stem 12 or 13 will be 6W. In other words, if the lever ratio is assumed to be as described above, the operating force is reduced to 1/6, thus greatly diminishing the operating force required to be applied to the operating lever 11. This makes possible very fine operation of the lever 11.

Figure 3:
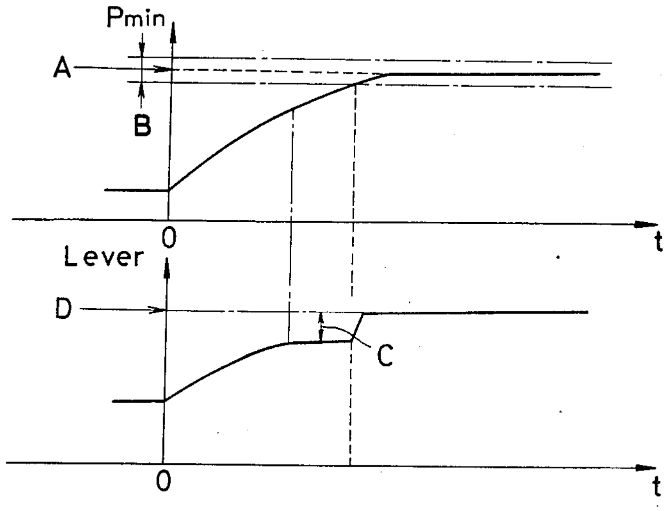
FIGS. 3 and 4 are flowrate characteristics.

The movable fulcrum 15 is provided on a rack 31 meshing with a pinion 33 that rotates in unison with a shaft of a stepping motor 32. The motor 32 is connected to a motor rotation control circuit 35, which is connected to a sensor 34 for sensing pressure in the minimum pressure line 7, a sensor 36 for sensing the position of the movable pivot point 15, and a sensor 37 for sensing displacement of the operating lever 11. These sensors provide the control circuit 35 with signals indicative of the quantities sensed. When pressure is increased, the grip 14 of the operating lever 11 is moved to the left, whereupon the point of application 16 of operating lever 11 also is shifted leftward thereby rotating the contacting link lever 17 about the fulcrum 21. The valve stem 12 connected to the line lever 17 at the fulcrum 19 is pulled to the right by the link lever 17 to open the pressure boost valve 8, whereby the working gas is allowed to pass through the minimum cycle pressure line 7 so as to supplied to the working space 1, thus raising the pressure. The pressure sensor 34 arranged in the minimum cylce pressure line 7 produces the aforementioned signal indicative of the sensed pressure and applies this signal to the electronic circuit 35. Until the sensed pressure reaches a constant pressure range B with respect to a target pressure A corresponding to the accelerator displacement input applied to the electronic circuit 35, the position of the movable fulcrum 15 is maintained in such a manner that the pressure boost valve 8 is held at an opening C, as shown in FIG. 3. When a valve within the pressure range is attained, the control circuit 35 causes the stepping motor 32 to displace the rack 31 provided with the movable fulcrum 15, thereby moving the fulcrum 15 to a position D at which the valve is fully closed. This terminates the increase in pressure.

Figure 4:
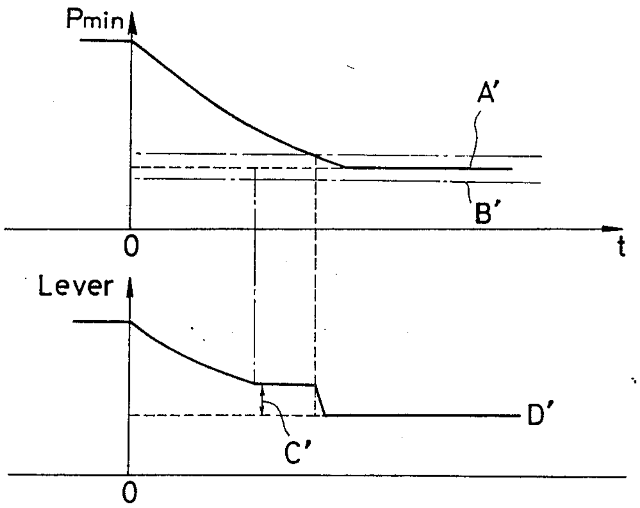

When pressure is to be reduced, the grip 14 is moved rightward, whereupon the pressure reducing valve 5 is opened via the operating lever 11 and link lever 17 by a mechanism similar to that described above, thus sending the working gas through the maximum cylce pressure line 4 so that the gas is introduced from the working space 1 to the working gas compressor to reduce pressure. As in the case mentioned above, the valve is held at the optimum opening C′ until a valve within the target pressure range B′ with respect to a target pressure A′ is attained. When this value has been reached, the stepping motor 32 is driven so as to fully close the pressure reducing valve 5 by moving the fulcrum 15 to a position C′ (see FIG. 4).

Though the pressure boost and pressure reducing valves can be replaced by electromagnetic valves to eliminate the problem encountered in the prior art, fine linear control is possible with an electromagnetic valve. By contrast, linear control can be carried out in accurate fashion in accordance with the present invention since the pressure boost and pressure reducing valves are opened and closed in dependence upon lever displacement.

If the present invention is applied to a pressure control apparatus, the process through which pressure rises and falls can be selected freely depending upon the manner in which the stepping motor is driven.

Specifically, with the conventional method as illustrated in FIG. 3, pressure can be varied solely through a fixed process decided by the valve flowrate characteristics. With the present invention, however, the pressure variation process can be set at will so as to optimize the output response of the Stirling engine.

As many apparently widely different embodiments of the present invention can be made without departing from the spirit and scope thereof, it is to be understood that the invention is not limited to the specific embodiments thereof except as defined in the appended claims.

What we claim is:

1. A Stirling engine control apparatus comprising:

a working gas compressor;

a working gas storage tank;

a maximum cycle pressure line connecting a working space to said working gas compressor and said working gas tank via a first check valve;

a pressure reducing valve provided in said maximum cycle pressure line;

a minimum cycle pressure line connecting said working space to said working gas storage tank via a second check valve;

a pressure boost valve provided in said minimum cycle pressure line;

an operating lever pivotable about a movable fulcrum for controlling opening and closing of said pressure reducing valve and said pressure boost valve;

a movable member on which the movable fulcrum of said operating lever is provided; and control means for positionally shifting said movable member upon comparing a target pressure corresponding to displacement of said operating lever and pressure within said minimum cycle pressure line.

2. The apparatus according to claim 1, wherein said control means comprises:

an electronic circuit to which the displacement of said operating lever, the position of said movable fulcrum and the pressure within said minimum cycle pressure line and applied as input signals, and a stepping motor controlled by said electronic circuit in response to said input signals for shifting said movable member.

* * * * *